United States Patent
Xu

(10) Patent No.: US 9,423,825 B2
(45) Date of Patent: Aug. 23, 2016

(54) MOBILE COMPUTING DEVICE WITH EXPANDED DISPLAY SIZE

(71) Applicant: NVIDIA Corporation, Santa Clara, CA (US)

(72) Inventor: Shuang Xu, Shenzhen (CN)

(73) Assignee: NVIDIA CORPORATION, Santa Clara, CA (US)

(*) Notice: Subject to any disclaimer, the term of this patent is extended or adjusted under 35 U.S.C. 154(b) by 301 days.

(21) Appl. No.: 13/763,549

(22) Filed: Feb. 8, 2013

(65) Prior Publication Data

US 2014/0228077 A1    Aug. 14, 2014

(51) Int. Cl.
*H04M 1/03* (2006.01)
*G06F 1/16* (2006.01)
*G06F 1/32* (2006.01)
*H04M 1/02* (2006.01)
*H04M 1/67* (2006.01)

(52) U.S. Cl.
CPC .......... *G06F 1/1626* (2013.01); *H04M 1/0266* (2013.01); *H04M 1/03* (2013.01); *G06F 1/3265* (2013.01); *G06F 2200/1637* (2013.01); *H04M 1/0264* (2013.01); *H04M 1/67* (2013.01); *H04M 2250/12* (2013.01); *Y02B 60/1242* (2013.01)

(58) Field of Classification Search
CPC .............. G06F 3/1423; G06F 3/1454; H04L 65/4092; H04L 67/04; H04W 52/027
USPC .......... 455/575.1, 575.3, 575.2, 575.4, 350, 455/566, 556.1, 550.1; 379/428.01, 433.02
See application file for complete search history.

(56) References Cited

U.S. PATENT DOCUMENTS

| | | | |
|---|---|---|---|
| 7,027,797 B2* | 4/2006 | Mori | 455/350 |
| 8,170,621 B1* | 5/2012 | Lockwood | 455/566 |
| 8,868,048 B2* | 10/2014 | Hanson | G06Q 40/02 455/414.1 |
| 8,963,865 B2* | 2/2015 | Hicks et al. | 345/173 |
| 2004/0120514 A1* | 6/2004 | Kitada | 379/428.01 |
| 2005/0012723 A1* | 1/2005 | Pallakoff | G06F 1/1616 345/173 |
| 2009/0264165 A1* | 10/2009 | Hakamata et al. | 455/575.1 |
| 2010/0056224 A1* | 3/2010 | Kim | 455/566 |
| 2013/0040711 A1* | 2/2013 | Kim et al. | 455/575.1 |
| 2014/0004907 A1* | 1/2014 | Kim et al. | 455/566 |

* cited by examiner

*Primary Examiner* — Michael T Vu

(57) ABSTRACT

A mobile computing device comprising a display panel and a home button, the display panel being disposed on the exterior front surface and the home button being disposed on the exterior back surface of the mobile computing device. The front surface may be free of any additional user Input/Output devices apart from the display panel. The mobile computing device may further comprise an accelerometer and a phone circuit. Upon detection that the display panel faces away from a user during a phone call, displayed information on the display panel may be concealed automatically. The accelerometer may be also operable to detect shaking motions on the mobile computing device as a user command to turn on or turn off the display panel.

19 Claims, 6 Drawing Sheets

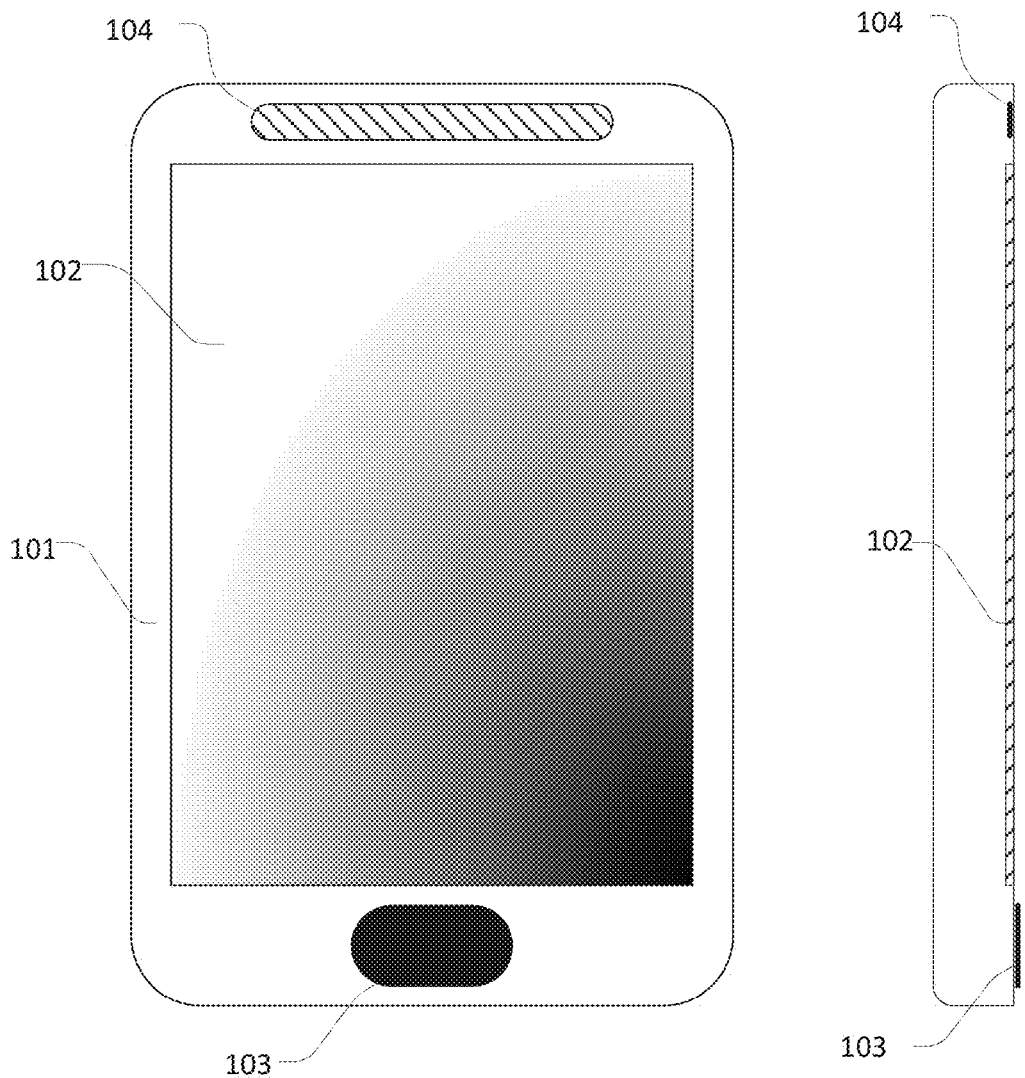

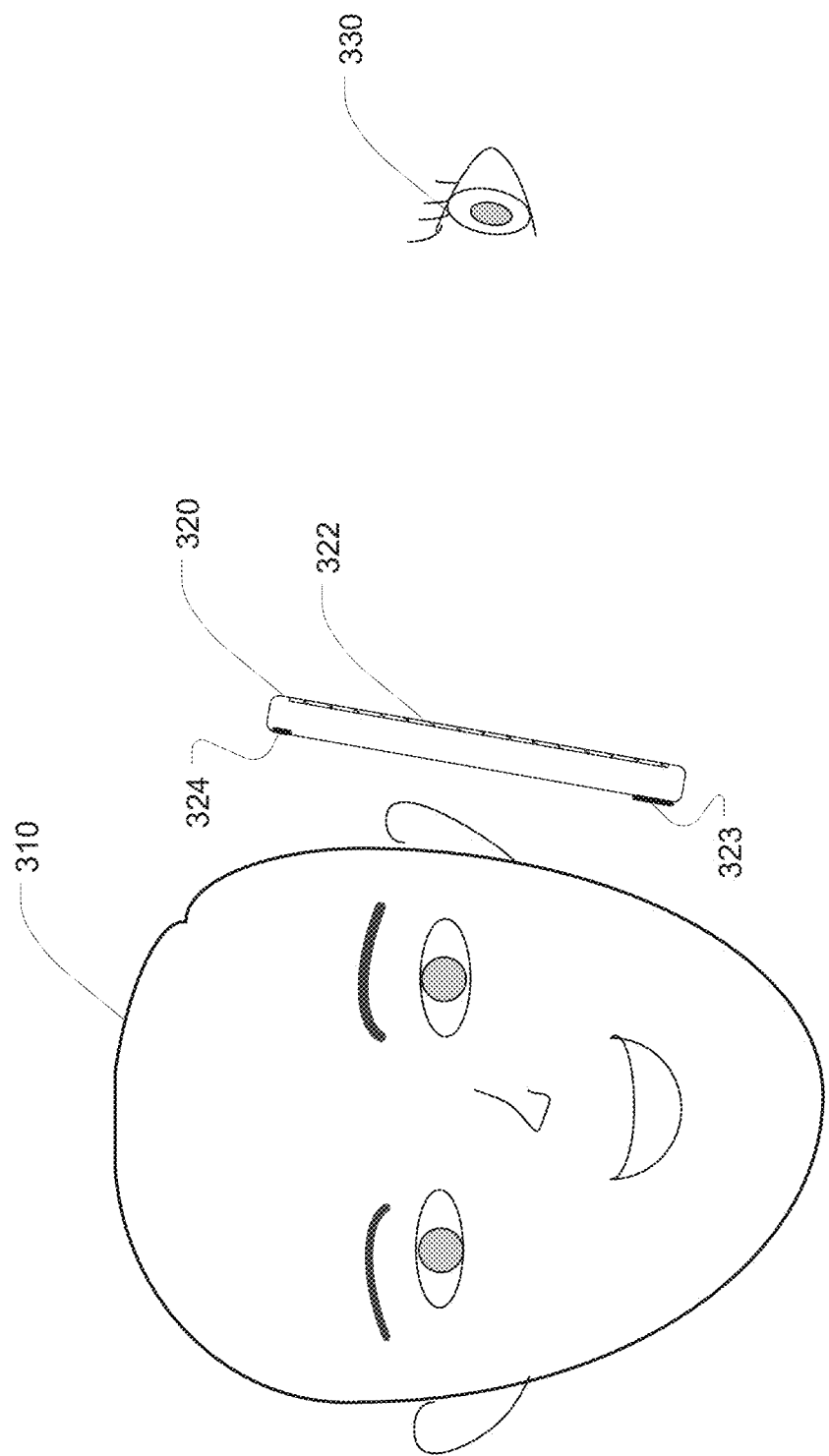

MOBILE COMPUTING DEVICE WITH EXPANDED DISPLAY SIZE

TECHNICAL FIELD

The present disclosure relates generally to the field of computing devices, and more specifically to the field of display panels of computing devices.

BACKGROUND

Touch screens have gained increasing popularity in computer systems and particularly in mobile computing devices, such as laptops, PDAs, media players, game controllers, touchpads, smartphones, etc. As more and more computing devices have become capable of accepting user input by detecting users' tactile pressure and by identifying users' voice commands for instance, hard keyboards have been commonly replaced with virtual input tables, e.g. on-screen soft keyboards. Thus, a touch screen can usually occupy a large portion of an exterior surface of a mobile device.

As consumer demand for device portability has continuously driven size reduction in mobile device designs, touch screen sizes have correspondingly shrunk, making the available display area on such devices increasingly limited. In addition, there are still a few other user Input/Output (I/O) devices, such as a home button, a speaker, a microphone, and a camera lens, that are conventionally arranged on the same exterior surface with the touch screen and compete with the touch screen for area. The functions of these user I/O devices are well known in the art. FIG. 1a is an exterior front view of a typical mobile computing device 100 in accordance with the prior art. Besides the touch screen 102, a loudspeaker 104 and a home button 103 are also disposed on the front side of the device 100. Among the I/O devices, a home button typically takes up a largest area second to the display panel, as illustrated in FIG. 1a. FIG. 1b is an exterior side view of the mobile computing device 100 in accordance with the prior art. It shows the display panel 102, the home button 103, and the loudspeaker 104 are situated on the same side of the device 100.

Due to the limited touch screen size and the even smaller effective viewing area on the touch screen, information is forced to be displayed in small sizes in order to present a reasonable amount of information in one page, which tends to cause eye strain and inconvenience on users.

SUMMARY OF THE INVENTION

Therefore, it would be advantageous to provide a mechanism to expand the effective viewing area of a touch screen on a mobile computing device with a given mobile device size.

Accordingly, embodiments of the present disclosure provide a mobile computing device equipped with a touch screen that occupies an extended portion of an exterior surface of the device. Embodiments of the present disclosure advantageously comprise a touch screen on an exterior surface and a home button on the opposite exterior surface of the device and accordingly allows for larger size touch screen designs.

In one embodiment of the present disclosure, a mobile computing device comprises a processor, a memory, an exterior housing, and a display panel. The exterior housing defines an exterior front and back surfaces and exterior sides. The exterior front surface is free of any additional user Input/Output (I/O) devices apart from the display panel. The mobile computing device may further comprise a home button (and speaker and microphone) disposed on the back surface. The mobile computing device may further comprise an accelerometer and operable to detect an orientation of the display panel. Upon detection that the display panel faces away from a user during a phone call, information on the display panel may be concealed automatically. The accelerometer may also be operable to detect a shaking motion on the mobile computing device as a user command to turn on or turn off the display panel.

In another embodiment of the present disclosure, a portable computing device comprises a processor, a bus, a memory, a first exterior surface, a second exterior surface that is opposite to the first surface, a touch display screen ("touch screen") located in the first exterior surface, and a home button located in the second exterior surface. The portable computing device may further comprise at least one another I/O component, such as a loudspeaker, a microphone, or a camera, situated in the second exterior surface. The portable computing device may further comprise an accelerometer coupled with the processor and operable to sense an orientation of the first exterior surface. Upon determination that the first exterior surface is oriented approximately vertically during the phone call, the processor is operable to blank out user data on the touch screen. The computing device may further comprise a motion sensor operable to detect a shaking applied on the computing device, wherein the processor is operable to selectively control activation and deactivation of the touch screen in response to the detection of the shaking.

In another embodiment of the present disclosure, a portable computing device comprises a processor, a bus, a memory, a housing assembly comprising a front outer surface and a back outer surface facing an approximate opposite direction from the first outer surface, a touch display screen ("touch screen") facing the front outer surface, and a menu button facing the back outer surface. The portable computing device may further comprise a first camera facing the front and a second camera facing the back outer surface. The portable computing device may further comprise a phone circuit. A microphone and a loudspeaker associated with the phone circuit may face the back surface. The portable computing device may further comprise an accelerometer operable to sense an orientation of the touch screen during a phone call. Upon determination that the touch screen is oriented approximately vertically during a phone call, the touch screen may be blanked out. The portable computing device may further comprise a motion sensor operable to detect a shaking motion applied on the device as a user instruction to activate or deactivate the touch screen.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

Embodiments of the present invention will be better understood from a reading of the following detailed description, taken in conjunction with the accompanying drawing figures in which like reference characters designate like elements and in which:

FIG. 1a is an exterior front view of a mobile computing device in accordance with the prior art.

FIG. 1b is an exterior side view of the mobile computing device in accordance with the prior art.

FIG. 3 illustrates a user using an exemplary mobile computing device with the loudspeaker situated on the opposite surface with the display panel in accordance with an embodiment of the present disclosure.

DETAILED DESCRIPTION

Figures 2A, 2B:
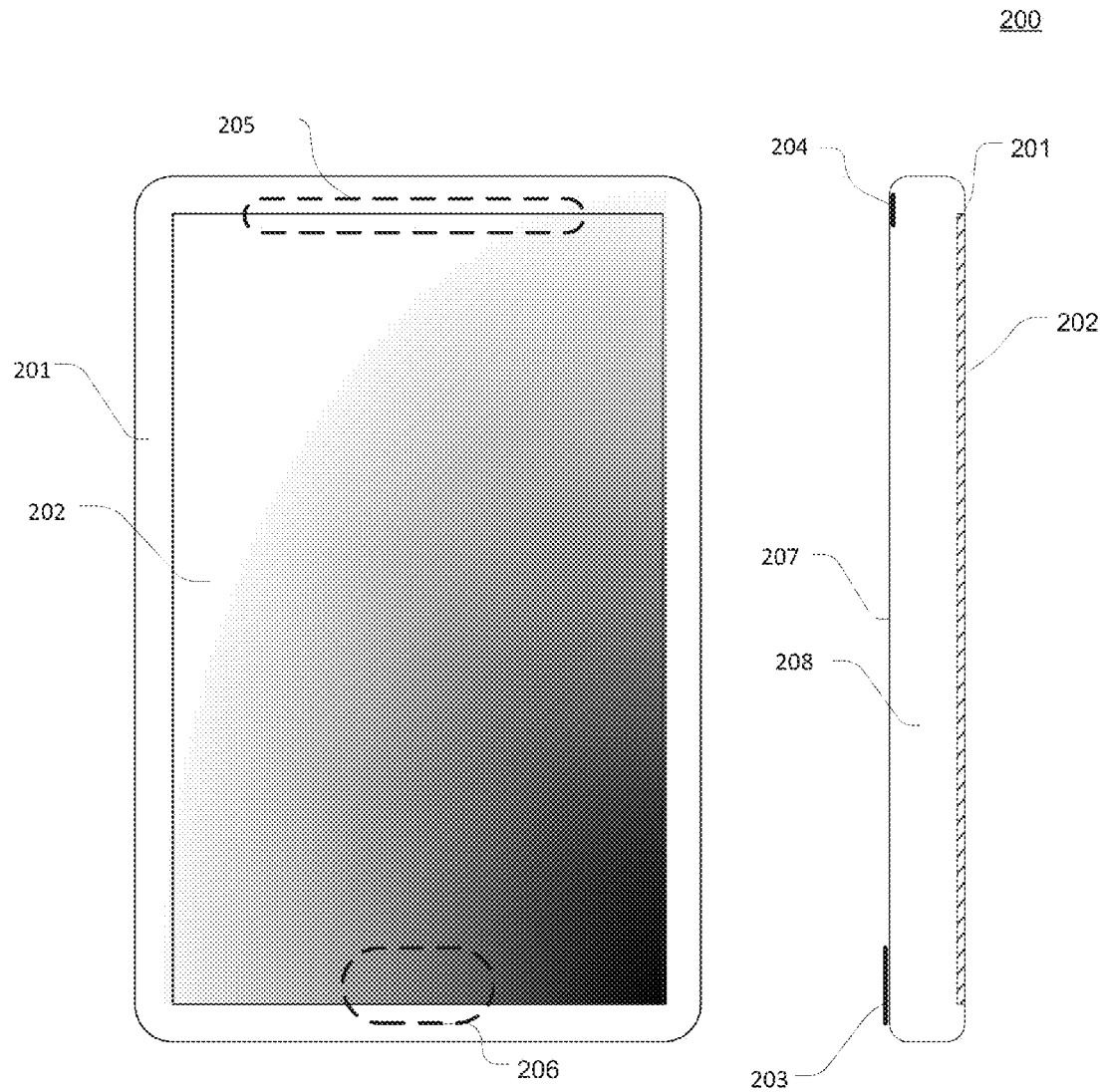
FIG. 2a illustrates an exterior front view of an exemplary mobile computing device with a display panel and a home button disposed on opposite surfaces of the device in accordance with an embodiment of the present disclosure.
FIG. 2b illustrates an exterior side view of the exemplary mobile computing device with the display panel and the home button disposed on opposite surfaces of the device in accordance with an embodiment of the present disclosure.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail so as not to unnecessarily obscure aspects of the embodiments of the present invention. The drawings showing embodiments of the invention are semi-diagrammatic and not to scale and, particularly, some of the dimensions are for the clarity of presentation and are shown exaggerated in the drawing Figures. Similarly, although the views in the drawings for the ease of description generally show similar orientations, this depiction in the Figures is arbitrary for the most part. Generally, the invention can be operated in any orientation.

Notation and Nomenclature

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "executing" or "storing" or "rendering" or the like, refer to the action and processes of a computer system, or similar electronic computing device, that manipulates and transforms data represented as physical (electronic) quantities within the computer system's registers and memories and other computer readable media into other data similarly represented as physical quantities within the computer system memories or registers or other such information storage, transmission or display devices. When a component appears in several embodiments, the use of the same reference numeral signifies that the component is the same component as illustrated in the original embodiment.

Mobile Computing Device with Expanded Display Size

FIG. 2a illustrates an exterior front view of an exemplary mobile computing device 200, e.g. smart phone, with a display panel 202 and a home button disposed on opposite surfaces of the device 200 in accordance with an embodiment of the present disclosure. FIG. 2b illustrates an exterior side view of the exemplary mobile computing device 200 with the display panel 202 and the home button 203 disposed on opposite surfaces of the device in accordance with an embodiment of the present disclosure. The device 200 comprises an exterior housing assembly that defines an exterior front surface 201, exterior back surface 207, and exterior sides 208.

As show in FIG. 2a, the touch panel display 202 is the only user Input/Output (I/O) device disposed on the front surface. The dashed contour lines 205 and 206 indicate the positions of the loudspeaker 204 and the home button 203 respectively which are both disposed on the back surface, as further illustrated FIG. 2b. Due to removal of the loudspeaker 204 and the home button 203 from the front surface, the display panel 202 can be advantageously designed to take up a larger fraction of the front surface than the conventional art as illustrated in FIG. 1a. Thereby, an expanded effective viewing area may be achieved, which may permit larger sizes or larger amounts of displayed information in one display page. In one embodiment, a microphone is disposed on the back surface as well.

In some other embodiments, the loudspeaker may remain on the same side, i.e. the front surface, with the display panel while the home button is placed on the opposite side, i.e. the back surface.

In some embodiments, the mobile device may also comprise other I/O devices disposed on the exterior housing, such as at least one of a camera, a microphone, a sleep/awake button, a volume control button, a headphone socket, an I/O socket, and/or a vibration/ring switch. Functions of these I/O devices are well known in the art. For purposes of this disclosure, these I/O devices may be disposed in any position relative to the display panel, such as on a side, the same surface, or the opposite surface, whereas the home button is disposed on the opposite surface to the display panel. In some embodiments, the display panel is the single user I/O device on the front surface of the mobile device while all other user I/O devices are disposed on the back surface. In some other embodiments, all the I/O devices including the display panel may be disposed on the same surface with the exception that the home button is disposed on the opposite surface.

In some embodiments, the mobile device comprises a phone circuit capable of enabling a phone call and is coupled with a loudspeaker and a microphone. In some embodiments, both the microphone and the loudspeaker are disposed on different surfaces from the display panel. FIG. 3 illustrates a user 310 engaged in using an exemplary mobile computing device 320 with the loudspeaker 324 situated on the opposite surface with the display panel 322 in accordance with an embodiment of the present disclosure. The microphone may be disposed on a side or the same surface with the loudspeaker 324. As illustrated, the user may hold the phone vertically during a phone call so that the loudspeaker faces his or her ear while leaving the display panel facing outside or away from the face. In addition to the advantage brought by an extended display size, this embodiment can beneficially prevent the user's ear from exerting unintended touch pressure on the touch screen and inadvertently causing the operation status of the mobile device 320 to change, for example, to hang up or to mute the phone call.

On the other hand, the display panel 322 may display information that the user 310 intends to keep confidential during the phone call from uninvited eyes 330, such as contact information, pictures, or web pages the user just browsed before the phone call. Hence, it may be desirable that the displayed information can be concealed on the display automatically. This can be implemented with assistance of a display orientation sensor capable of detecting instantaneous orientation of the display panel. The sensor can be of any type that is well known in the art, for instance an accelerometer. The sensor can be coupled with a processor of the mobile computing device through control logic. In this way, when the phone circuit is being used, and when the phone is in the vertical orientation, as in FIG. 3, the display is automatically blanked.

Figure 4:
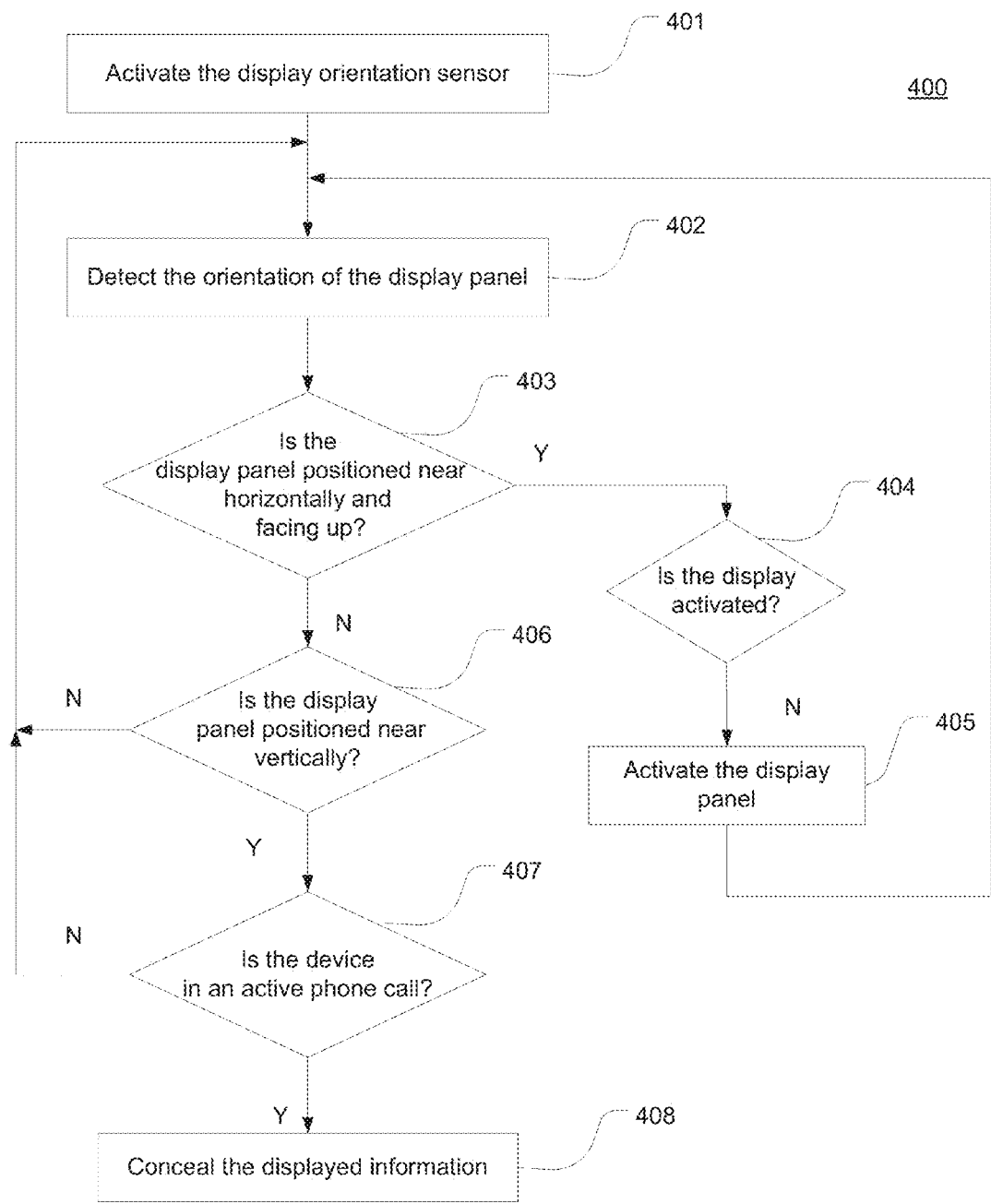
FIG. 4 is a flow chart illustrating an exemplary computer implemented method of concealing displayed information upon determination that the display panel is facing a direction away from the user's eyes during a phone call in accordance with an embodiment of the present disclosure.

FIG. 4 is a flow chart illustrating an exemplary computer implemented method 400 of concealing displayed information upon determination that the display panel is facing in a direction away from the user's eyes (or face) during a phone call in accordance with an embodiment of the present disclosure. At 401, the display orientation sensor can be enabled. For instance, it can be enabled by control logic through a hardware control button that is accessible by the user. Alternately, the processor may execute an application program and send instructions to the control logic to activate the display orientation sensor.

The orientation sensor is then capable of detecting an orientation of the display panel at 402. At 403, the sensor may provide an orientation signal for the processor to determine if the display panel is positioned near horizontally and facing up which is the typical orientation when a user reads or attempts to read the display at 403. If the mobile device faces up, and it is further determined at 404 that the display is in a sleeping mode, activate the display panel at 405. However, if the display panel is not facing up, and it is further determined that the display panel is in a near vertical orientation at 406 that and the device is in an active phone call at 407, the displayed information is concealed at 408 because it is the typical orientation when the user holds the mobile device during a phone call, as FIG. 3 shows. In some embodiments, the display can be disabled to blank the displayed information. In some other embodiments, the displayed information can be replaced by, e.g., a wall paper or any other non-private information as a user may optionally set forth.

Usually a user can enable or disable the display panel of a mobile computing device through an appropriate application program. Whereas, it may be desirable that the user can enable or disable the display panel more conveniently and easily. In some embodiments, a user may turn on or turn off the display panel simply by gently shaking the mobile device, for example twice consecutively. This can be implemented by employing a motion sensor capable of detecting shaking motions applied on the device. The motion sensor can be of any type that is well known in the art, for instance an accelerometer. The sensor can be coupled with a processor of the mobile computing device through control logic.

Figure 5:
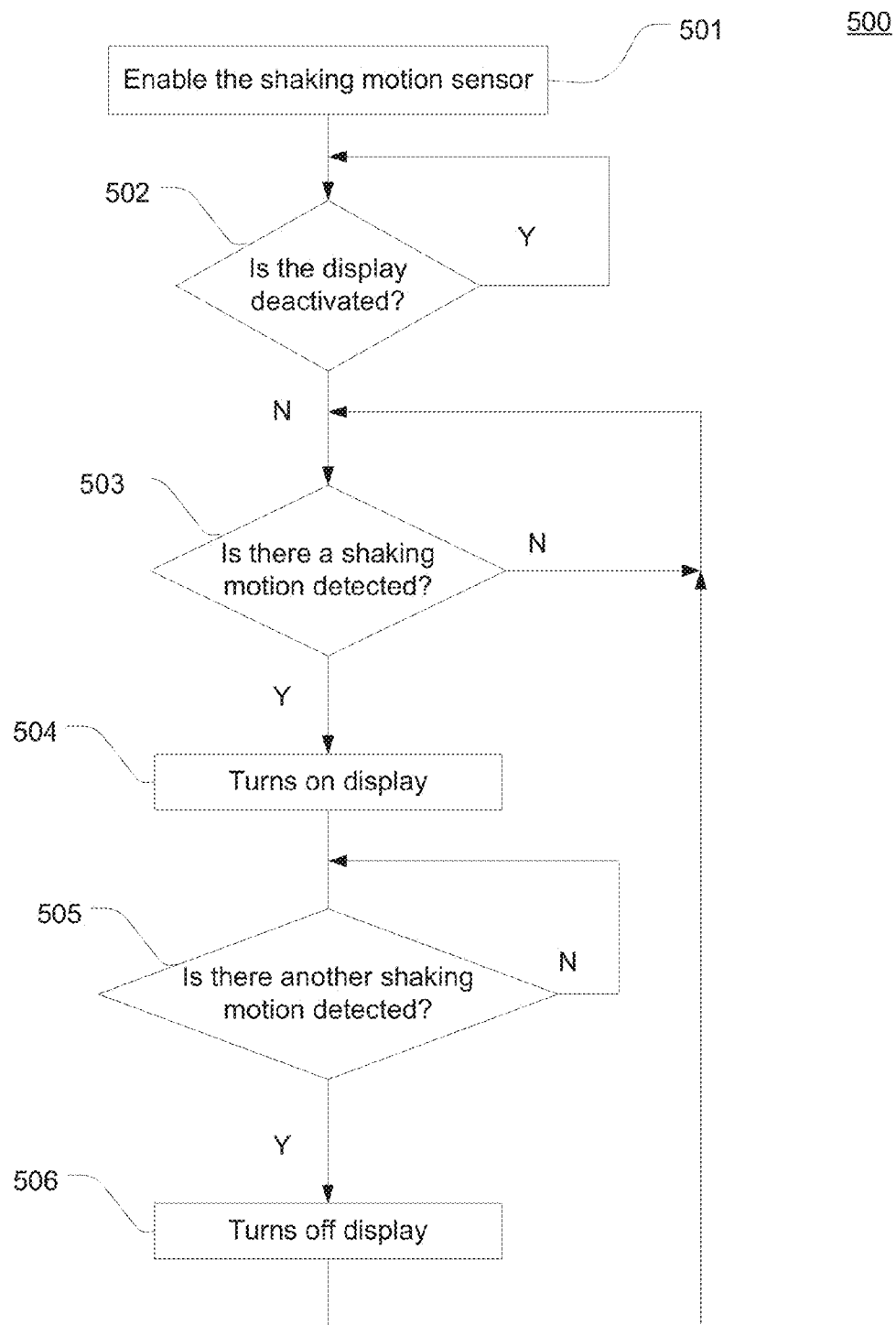
FIG. 5 is a flow chart depicting an exemplary computer implemented method for controlling a display panel based on shaking motions applied on a mobile computing device in accordance with an embodiment of the present disclosure.

FIG. 5 is a flow chart depicting an exemplary computer implemented method 500 for controlling a display panel based on shaking motions from a user in accordance with an embodiment of the present disclosure. At 501, the shaking motion sensor is enabled, either by a hardware button coupled with the shaking motion sensor and accessible to the user, or by pertinent application software. If it is determined that the display is deactivated at 502, it is then further determined whether there is a shaking motion detected at 503. If yes, the display is turned on at 504. If another shaking motion is detected subsequently at 505, the display is then turned off at 506. The foregoing 503-506 are repeated until, for example, the shaking motions sensor is turned off.

In some embodiments, the processor may send an indicia to the user before the display panel is enabled or disabled in response to a detection of a shaking motion. The indicia may be a vibration, a sound or any other suitable alert signal that are well known in the art and operate to inform a user on the change of the operating status of the display panel.

Figure 6:
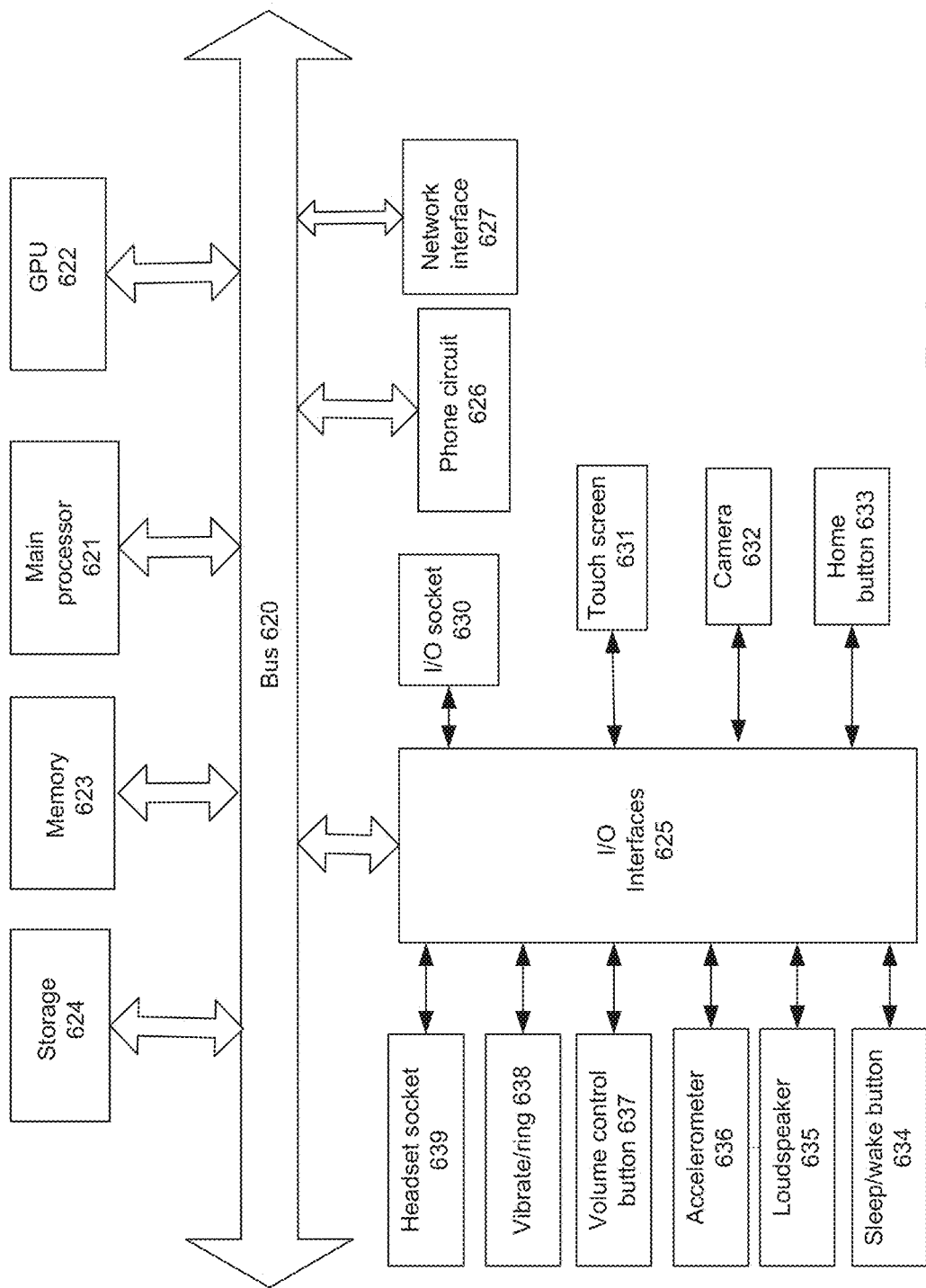
FIG. 6 is a functional block diagram illustrating an exemplary configuration of a mobile computing device that comprises a touch screen display and a home button disposed on opposite surfaces of the mobile device in accordance with an embodiment of the present disclosure.

A mobile computing device comprising a display panel and a home button arranged in opposite surfaces in accordance with the present disclosure can be a laptop, a cell phone, a personal digital assistance (PDA), a touchpad, a game display panel, etc. FIG. 6 is a functional block diagram illustrating the configuration of an exemplary mobile computing device 600 that comprises a touch screen display 631 and a home button 633 disposed on opposite surfaces of the mobile device 600 in accordance with an embodiment of the present disclosure. In some embodiments, the mobile computing device 600 can provide computing, communication and/or media play back capability. The mobile computing device 600 can also include other components (not explicitly shown) to provide various enhanced capabilities.

According to the illustrated embodiment in FIG. 6, the computing system 600 comprises a main processor 621, a memory 623, a Graphic Processing Unit (GPU) 622 for processing graphic data, network interface 627, a storage device 624, phone circuits 626, I/O interfaces 625 coupled with a number of user I/O devices.

The main processor 621 can be implemented as one or more integrated circuits and can control the operation of mobile computing device 600. In some embodiments, the main processor 621 can execute a variety of operating systems and software programs and can maintain multiple concurrently executing programs or processes. The storage device 624 can store user data and application programs to be executed by main processor 621, such as video game programs, personal information data, media play back program. The storage device 624 can be implemented using disk, flash memory, or any other non-volatile storage medium.

Network or communication interface 627 can provide voice and/or data communication capability for mobile computing devices. In some embodiments, network interface can include radio frequency (RF) transceiver components for accessing wireless voice and/or data networks or other mobile communication technologies, GPS receiver components, or combination thereof. In some embodiments, network interface 627 can provide wired network connectivity instead of or in addition to a wireless interface. Network interface 627 can be implemented using a combination of hardware, e.g. antennas, modulators/demodulators, encoders/decoders, and other analog/digital signal processing circuits, and software components.

I/O interfaces 625 provide communication and control between the mobile computing device 600 with built-in I/O devices and other external I/O devices through an I/O socket 630. The external I/O devices may be e.g. a computer, an external speaker dock or media playback station, a digital camera, a separate display device, a card reader, a disc drive, an in-car entertainment system, a storage device, an user input device or the like.

According to the illustrated embodiment, the built-in I/O devices comprises a touch screen 631, one or more cameras 632, a home button 633, a sleep/wake button 634, a loudspeaker 635, an accelerometer 636, a vibrate/ring switch 638, and a volume control button 637, and a headset socket 639.

Although certain preferred embodiments and methods have been disclosed herein, it will be apparent from the foregoing disclosure to those skilled in the art that variations and modifications of such embodiments and methods may be made without departing from the spirit and scope of the invention. It is intended that the invention shall be limited only to the extent required by the appended claims and the rules and principles of applicable law.

What is claimed is:

1. A mobile computing device comprising:
   a processor coupled to a bus;
   a memory coupled to said bus;
   an exterior housing assembly defining an exterior front surface, an exterior back surface opposite to said exterior front surface, and exterior sides;
   a home button disposed on said exterior back surface; and
   a display panel coupled with said bus and operable to display information and operable to receive touch input from a user,
   wherein said exterior front surface is free of any additional user Input/Output (I/O) devices apart from said display panel.

2. The mobile computing device as described in claim 1 further comprising a plurality of user I/O devices disposed in said exterior housing, wherein said plurality of user I/O devices comprise two or more of: a home button; a loudspeaker; a microphone; a camera; a sleep/wake button; a volume control button; a headphone socket; and an I/O socket.

3. The mobile computing device as described in claim 1 further comprising a phone circuit operable to enable phone calls, wherein said phone circuit comprises a loudspeaker which is situated on said exterior back surface.

4. The mobile computing device as described in claim 3 further comprising an accelerometer coupled with said bus and operable to sense an orientation of said exterior front surface and generate an orientation signal, wherein said display panel is operable to display user data during a phone call, and wherein further said processor is operable to cause to conceal said user data on said display panel upon a determination that said exterior front surface is oriented approximately vertically during a phone call based on said orientation signal.

5. The mobile computing device as described in claim 3, wherein said accelerometer is operable to sense a shaking motion applied on said exterior housing assembly and to generate a shaking motion signal in response thereto, and wherein further said processor is operable to cause to selectively activate and deactivate said display panel in response to said shaking motion signal.

6. The mobile computing device as described in claim 5, wherein said processor is operable to generate an indicia to a user in response to said shaking motion signal.

7. A portable computing device comprising:
   a processor coupled to a bus;
   a memory coupled to said bus;
   a first exterior surface, and a second exterior surface that is opposite to said first exterior surface;
   a touch screen coupled with said bus and located in said first exterior surface, said touch screen operable to display a Graphic User Interface (GUI) and operable to receive touch input from a user, wherein said first exterior surface is free of any additional user Input/Output (I/O) devices apart from said touch screen; and
   a home button coupled with said bus and located in said second exterior surface, said home button operable to close at least one active application program and navigate to an application solution GUI.

8. The portable computing device as described in claim 7 further comprising at least one I/O component situated in said second exterior surface, said at least one I/O component comprising at least one of: a loudspeaker; a microphone; and a camera.

9. The portable computing device as described in claim 8 further comprising a phone circuit coupled with said bus and operable to enable a phone call, wherein said touch screen is operable to display user data pertaining to said phone call.

10. The portable computing device as described in claim 9 further comprising an accelerometer coupled with said bus and operable to sense an orientation of said first exterior surface during said phone call, wherein said processor is operable to blank out said user data on said touch screen upon a determination that said first exterior surface is oriented approximately vertically during said phone call.

11. The portable computing device as described in claim 7 further comprising a motion sensor coupled with said bus and operable to detect a shaking applied on said exterior surfaces, wherein said processor is operable to selectively control activation and deactivation of said touch screen in response to detection of said shaking.

12. The portable computing device as described in claim 11, wherein said motion sensor is an accelerometer.

13. The portable computing device as described in claim 11, wherein said processor is operable to generate a vibration indication before said touch screen is deactivated in response to detection of said shaking.

14. A portable computing device comprising
   a processor coupled to a bus;
   a memory coupled to said bus;
   a housing assembly comprising a front outer surface and a back outer surface facing an approximate opposite direction from said first outer surface;
   a touch screen assembly supported by said housing assembly and facing said front outer surface, said touch screen assembly operable to display a graphical user interface (GUI) of a program that is executable by said processor; and
   a menu button supported by said housing assembly and facing said back outer surface, said menu button coupled with said processor and operable to close an active program and navigate to a home screen GUI.

15. The mobile computing device as described in claim 14 further comprising a first camera facing said front outer surface, and a second camera facing said back outer surface.

16. The mobile computing device as described in claim 14 further comprising a speaker and a microphone, both facing said back outer surface.

17. The portable computing device as described in claim 16 further comprising a phone circuit coupled with said bus and operable to enable a phone call, wherein said touch screen assembly is operable to display user data pertaining said phone call.

18. The portable computing device as described in claim 17 further comprising an accelerometer coupled with said processor and operable to sense an orientation of said touch screen assembly during said phone call, wherein further said processor is operable to cause to blank said touch screen assembly upon a determination that said touch screen assembly is oriented approximately vertically during said phone call.

19. The portable computing device as described in claim 17 further comprising a motion sensor coupled with said bus and operable to detect a shaking motion applied on said housing assembly, wherein said processor is operable to cause to selectively activate and deactivate said touch screen assembly in response to detection of said shaking motion.

* * * * *